Aug. 23, 1932.   R. L. STIMSON ET AL   1,873,356
EYE TESTING DEVICE
Filed Oct. 17, 1929
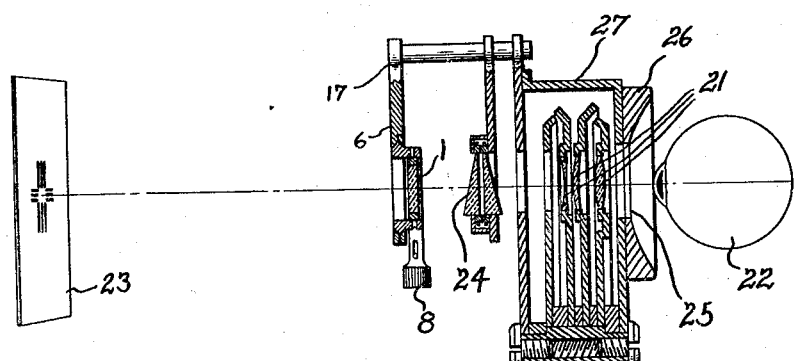
Fig. I.
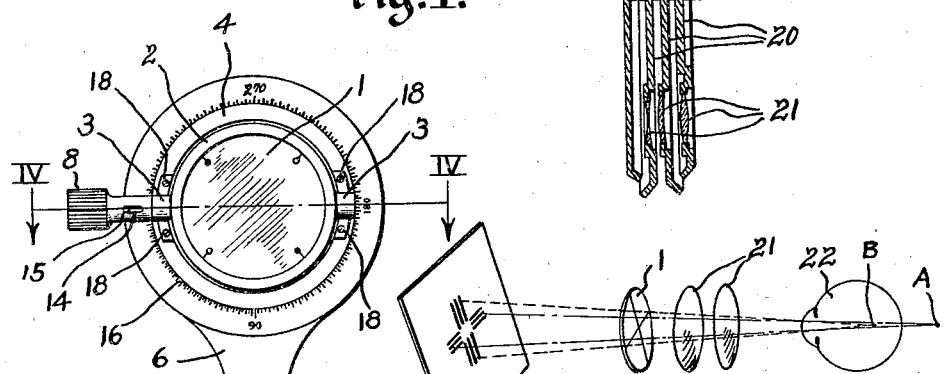
Fig. II.   Fig. V.
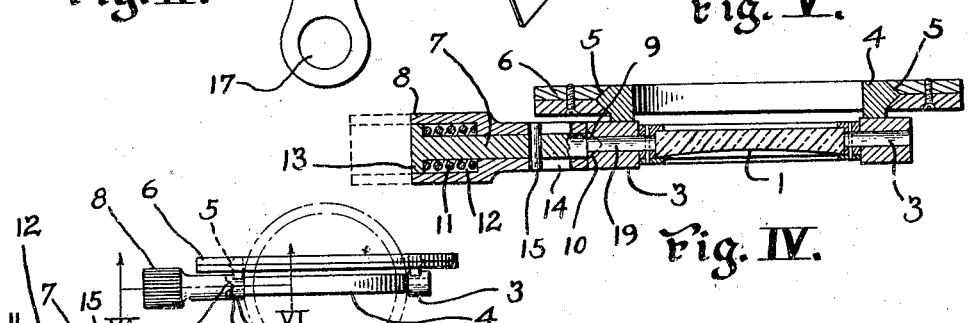
Fig. IV.
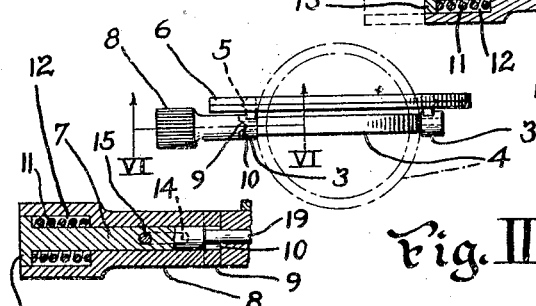
Fig. III.   Fig. VI.
Inventor
Russell L. Stimson.
William H. Boutelle.
By Harry H. Styll.
Attorney Patented Aug. 23, 1932

1,873,356

UNITED STATES PATENT OFFICE

RUSSELL L. STIMSON, OF SAN FRANCISCO, CALIFORNIA, AND WILLIAM H. BOUTELLE, OF STURBRIDGE, MASSACHUSETTS, ASSIGNORS TO AMERICAN OPTICAL COMPANY, OF SOUTHBRIDGE, MASSACHUSETTS, A VOLUNTARY ASSOCIATION OF MASSACHUSETTS

EYE TESTING DEVICE

Application filed October 17, 1929. Serial No. 400,381.

This invention relates to improvements in eye testing devices and has particular reference to improved means of determining the accommodative requirements of the eye.

The principal object of the invention is to provide improved means of testing errors in refraction.

Another object of the invention is to provide testing means which may be quickly and easily manipulated.

Another object of the invention is to provide improved means of supporting the refractive error testing means.

Another object of the invention is to simplify the test and increase the accuracy and speed of refraction.

Another object is to provide an improved holder for the crossed cylinder lens used in refractive tests.

Other objects and advantages of the invention will be apparent from the following description taken in connection with the accompanying drawing, and it will be apparent that many changes may be made in the details of construction and arrangement of parts without departing from the spirit of the invention as expressed in the accompanying claims. We, therefore, do not wish to be limited to the exact details shown and described as the preferred form only has been shown by way of illustration.

Referring to the drawing:

Fig. I is a fragmentary diagrammatic sectional view showing the lenses of an eye testing instrument as used in combination with the device embodying the invention.

Fig. II is a front elevation of the cross cylinder cell.

Fig. III is a plan view of Fig. II.

Fig. IV is an enlarged sectional view taken on line IV—IV of Fig. II.

Fig. V is a diagrammatic view illustrating the use of the cross cylinder lens.

Fig. VI is a fragmentary sectional view on line VI—VI of Fig. III.

The test in which the present invention is involved is called the cross cylinder test and is used as a final check on the findings in the refractive examination of the eye or to determine whether or not the errors found are of the required prescriptive value to give proper comfort to the patient.

The lens used in making this test consists as its name implies, of a cross cylinder having a plus cylindrical power in one meridian, and a minus cylindrical power in the opposite meridian, or its sphero-cylinder equivalent, with the axis placed at any desired position. The test card employed in connection with the use of this lens consists of two sets of lines, preferably three or four vertical lines and three or four horizontal lines.

The effect of placing such a lens before an emmetropic eye or one made so by the use of proper distance lens correction when viewing the test card, say at approximately 13 inches, is supposed to be an equality of the two opposing sets of lines, and is accounted for by the fact that the minus cylinder calls for extra accommodation, for the horizontal lines, and the plus cylinder, relieves the accommodation for the vertical lines. Therefore, if the eye being tested favors either set of lines on the test chart when viewed through the cross cylinder lens, the lenses in the prescriptive findings are either too weak or too strong. In other words, we have one set of rays which would come to a focus behind the retina as shown at "A" in Fig. V, and one set which would focus in front of the retina as at "B" in Fig. V, hence in viewing lines corresponding to these two foci, we have two correspondingly blurred images.

Now, if the horizontal lines appear to be the blackest (most distinct) to the observer, we merely add plus spherical lens power until the two sets of lines are equally distinct. Such lens power indicates the deficiency of the accommodation.

If, however, the vertical lines are the most distinct we have a case requiring a minus sphere added to the correction, in order to equalize the lines. This represents the amount of excess refraction present.

In this manner the approximation arrived at by the shadow test, ophthalmometer, trial lenses, stenopaic slit, astigmatic chart, etc., may be checked by placing the approximate correction or findings before the eyes and then using the cross cylinder test as stated above.

In making the test and to determine whether or not the patient really sees one set of lines plainer or blacker than the other, the lens is rotated to cause the opposite axis to occupy the same direction as the other axis or to reverse the positions of the two axes. The person under examination is asked to state which of the two directions gives the better vision of either sets of lines or if there is any change. The correction before the eye is then changed in accordance with the person's statement.

In cases of astigmatism the cross cylinder lens must be revolvable to permit one of its axes to be aligned with or placed parallel with the axis of the cylinder in the correction and also to permit the lens to be turned so as to cause the other (opposite) axis of the cross cylinder to occupy the same direction as the first or to reverse the position of the two axes. The patient is then asked what changes take place and the correction is changed according to the patient's statements.

The changing of positions of the axes of the cross cylinder lens before the eye must be done very rapidly so that the eye does not have a chance to relax during the interchanging. Should a relaxation occur there would be inaccuracies in the test.

In the past this rapid interchanging was very difficult and practically impossible due to the lens having to be removed from the trial lens cell, thence reversed and then replaced in the cell. This took considerable time and caused many inaccurate tests. The cross cylinder lens itself was a small separate device which was constantly misplaced, lost or dropped and broken during its use and was therefore quite impractical.

The present invention obviates these various difficulties and inconveniences by mounting the cross cylinder lens on the instrument in combination with which it is to be used so that it cannot be misplaced or lost, and also provides means whereby the lens may be quickly manipulated to change the axes without allowing the eye to relax during the change.

Referring more particularly to the drawing wherein like characters of reference denote corresponding parts throughout the invention comprises placing the cross cylinder lens 1 in a holder 2 which is pivoted at 3 to permit its being revolved as shown by the dot and dash lines in Fig. III.

The pivots 3 are secured to a beveled edged ring 4 which is rotatably mounted in the beveled groove 5 in the main support 6. This allows the cross cylinder lens to be rotated as well as revolved in either direction to interchange or vary the axes of the lens when desired.

One of the pivot pins 19 of the pivots 3 is provided with an extension 7 on which a handle member 8 is slidably mounted to provide means for manipulating the lens 1.

The handle 8 is provided at one end with a beveled tongue 9 which is adapted to extend into a groove 10 formed in one of the pivot bearings 3 to lock the lens 1 in working position.

A spring 11 positioned in a recess 12 formed in the handle 8 tends to urge the beveled tongue 9 into constant engagement with the groove 10.

An enlarged end 13 on the extension 7 holds the spring 11 in place therein.

The handle 8 is provided with a groove 14 in which a pin 15 carried by the extension 7 extends to hold the various parts in accurate working relation and also to limit the sliding movement of the handle 8 on said extension.

Suitable graduations 16 are formed on the support 6 to indicate at which angle the axis of the cylinder is positioned when the lens 1 is rotated in its holder.

This type of cross cylinder is designed for use in combination with an eye testing instrument known as the Phoroptor or similar eye testing device, a portion of the lens cells of which are shown in cross section in Fig. I. The support 6 is provided with a pivot connection 17 by means of which it is pivotally connected to the instrument as shown in Fig. I. The cross cylinder cell is adapted to be moved into and out of alignment with the eye under test by swinging the support 6 on the pivot 17 to move the lens 1 into and out of alignment with the sight opening 25 formed in the eye piece 26 carried by the frame 27.

Referring to Fig. I, the operation of the device and test as made in the present invention comprises rotating the lens cells 20 of the eye testing instrument until the proper correction lenses 21 are before the eye 22. The cross cylinder lens is then swung into alignment with the eye under test, it being understood that the proper chart 23 is previously positioned before the eye as shown.

The patient is then put through the test as previously described. Should he need a plus or minus correction the lens cell 20 having the proper lenses 21 is rotated to align the power lens desired with the eye under test. A careful record of the changes are made during the test.

To revolve the cross cylinder lens cell as shown in Fig. III, the handle 8 is pulled outwardly against the action of the spring 11 until the beveled tongue 9 is free of the groove 10, whereupon the handle 8 is given a half turn and simultaneously slightly released to allow the beveled tongue 9 to reseat itself in the groove 10 through the action of the spring 11. This holds the lens 1 in definite working position. The revolving of the cell is done very quickly and does not allow the eye to relax during the turning as has often occurred in the prior art tests.

The cylinder cell may also be rotated to position the axes of the cross cylinder at any desired meridian by grasping the handle 8 and turning the cell in the beveled groove 5. The graduations 16 are used in this instance to locate the axis desired.

In making binocular tests the rotary prisms 24 shown in Fig. I may be incorporated in the tests if desired.

The cross cylinder lens 1 is rotated transversely of its support to permit its plus or minus axis to be aligned with the cylinder axis in the correction lenses before the eyes of the subject and is revolvable when in aligned position with the correction lenses to reverse the position occupied by the plus and minus axes of the cross cylinder lens, that is, to cause the minus axis to occupy the previous position of the plus axis and vice versa, or to cause the cylinder axis in one meridian to move to another meridian ninety degrees therefrom, the purpose being to confirm the findings with the regular test lenses. If the subject does not notice any change in the appearance of the lines in the different meridians of the test chart 23 when viewed through the cross cylinder lens and when the lens is revolved to change the position of its axes the correction of the regular test lenses is assumed to be accurate. Should the subject report that one set of lines in one meridian appears darker or more distinct than the other set in the opposite meridian a plus or minus addition to the cylinder correction should be included, depending entirely upon the findings when the plus and minus axes of the cross cylinder lens are reversed.

From the foregoing description it will be seen that we have provided new and improved means for supporting a cross cylinder lens wherein tests of refractive errors may be made with greater speed and accuracy.

Having described our invention we claim:

1. A device of the character described, the combination of a support having a ring rotatably mounted thereon, a second ring pivoted to the first ring and rotatable at least 180 degrees in a direction substantially at right angles to the rotation of the first ring, a lens in the second ring and a handle on said second ring by means of which the lens may be rotated in either direction, the pivotal axis of said second ring passing substantially through the optical center of the lens.

2. In a device of the character described, a support having a ring member rotatably mounted thereon, a lens cell pivoted to the ring member and rotatable in a direction substantially at right angles to the rotary movement of the ring member and means between said ring member and lens cell for locking the cell against rotary movement in one direction.

3. In a device of the character described, a support having a ring member rotatably mounted thereon, a lens cell pivoted to the ring member adapted to rotate in a direction substantially at right angles to the rotary movement of the ring member, means on the lens cell by means of which the said cell is rotated in either direction and means operated by said last named means for locking the lens cell against movement in one direction.

4. In a device of the character described, a support having a ring member rotatably mounted thereon, a lens cell pivoted to the ring member adapted to rotate in a direction substantially normal to the rotary movement of the ring member, a handle on the cell by means of which the said cell is rotated in either direction and lock means controllable by movement of said handle for locking the lens cell against movement in one direction.

5. In a device of the character described, a support having a ring member rotatably mounted thereon, a cell having a crossed cylinder lens therein pivoted to the ring member and rotatable in a direction opposite the rotary movement of the ring member, a handle slidably connected to the crossed cylinder cell, lock means between the handle and ring member and means in said handle for controlling the sliding movement thereof to operate the lock means.

6. In a device of the character described in combination with a member having a sight opening, a support, a lens holder pivoted to the support adapted to be moved into and out of alignment with the sight opening and a lens in the lens holder rotatable in a plane normal to the axis of the lens and for 180 degrees at least in the plane of the axis of the lens about an axis passing substantially through its optical center.

7. In a device for testing the eyes having a member with a sight opening therein, a support having a ring member rotatably mounted thereon, a lens cell pivoted to the ring member and rotatable in a direction substantially at right angles to the rotary movement of the ring member, means between said ring member and lens cell for locking the cell against rotary movement in one direction and means by which the support may be moved so that the lens may be brought into and out of alignment with the sight opening.

8. In a device for testing the eyes having a member with a sight opening therein, a support having a ring member rotatably mounted thereon, a lens cell pivoted to the ring member adapted to rotate in a direction substantially at right angles to the rotary movement of the ring member, means on the lens cell by means of which the said cell is rotated in either direction, means operated by said last named means for locking the lens cell against movement in one direction and means by which the support may be moved so that the lens may be brought into or out of alignment with the sight opening.

9. In a device for testing the eyes having a member with a sight opening therein, a support having a ring member rotatably mounted thereon, a lens cell pivoted to the ring member adapted to rotate in a direction substantially normal to the rotary movement of the ring member, a handle on the cell by means of which the said cell is rotated in either direction, lock means controllable by movement of the said handle for locking the lens cell against movement in one direction and means by which the support may be moved so that the lens may be brought into and out of alignment with the sight opening.

10. In a device for testing the eyes having a member with a sight opening therein, a support having a ring member rotatably mounted thereon, a cell having a cross cylinder lens therein pivoted to the ring member and rotatable in a direction opposite the rotary movement of the ring member, a handle slidably connected to the cross cylinder cell, lock means between the handle and ring member, means in said handle for controlling the sliding movement thereof to operate the lock means and means by which the support may be moved so that the lens may be brought into and out of alignment with the sight opening.

11. In a device for testing eyes having a member with a sight opening therein, a support, a lens rotatably mounted on the support, means on said support by which the lens may be rotated in its own plane, means also on said support by which the lens may be turned completely over in a direction normal to its own plane and about an axis passing substantially through its center, and means by which the support may be moved so that the lens may be brought into or out of alignment with the sight opening.

12. In a device of the character described, a support, a lens rotatably mounted on the support, means on the support by which the lens may be rotated in its own plane, and other means also on the support by which the lens may be turned completely over in a direction normal to its own plane and about an axis passing substantially through its center.

13. In a device of the character described, a support, a cross cylinder lens rotatably mounted on the support, means on the support by which the cross cylinder lens may be rotated in its own plane, and other means also on the support by which the cross cylinder lens may be turned completely over in a direction normal to the plane of the lens and about an axis substantially intersecting the optical axis of the lens.

RUSSELL L. STIMSON.
WILLIAM H. BOUTELLE.